United States Patent [19]

Kisters

[11] Patent Number: 4,753,785

[45] Date of Patent: Jun. 28, 1988

[54] METHOD OF PURGING OF WASTE GASES

[75] Inventor: Theodor Kisters, Krefeld, Fed. Rep. of Germany

[73] Assignee: Deutsche Babcock Anlagen Aktiengesellschaft, Oberhausen, Fed. Rep. of Germany

[21] Appl. No.: 535,773

[22] Filed: Sep. 23, 1983

[30] Foreign Application Priority Data

Sep. 24, 1982 [DE] Fed. Rep. of Germany ....... 3235341

[51] Int. Cl.[4] .................... C01B 7/00; C01B 17/00; B01J 8/00
[52] U.S. Cl. ................................ 423/240; 423/242; 423/244; 110/343
[58] Field of Search .......... 423/242 A, 242 R, 244 A, 423/244 R, 240 R, 240 S; 110/343, 345

[56] References Cited

U.S. PATENT DOCUMENTS

| | | |
|---|---|---|
| 3,411,864 | 11/1968 | Pallinger ............................. 423/242 |
| 3,520,649 | 7/1970 | Tomany et al. ..................... 423/242 |
| 3,969,482 | 7/1976 | Teller .................................. 423/240 |
| 3,995,005 | 11/1976 | Teller .................................. 423/242 |
| 4,309,393 | 1/1982 | Nguyen ............................... 423/242 |

*Primary Examiner*—Gregory A. Heller
*Attorney, Agent, or Firm*—Michael J. Striker

[57] ABSTRACT

A method of purging waste gases by adding to the gas, while it flows through an absorber, a neutralizing agent, such as lime, together with a liquid substance under such conditions that the liquid is evaporated and that a dry salt is left as reaction product. The absorption results in a reaction of the noxious compounds in the waste gases with the neutralizing agent, whereby dry salts are formed, which are removed from the absorber. The same neutralizing agent in the form of the aqueous solution or aqueous suspension may be used as the liquid substance. The liquid substance is supplied into the absorber downstream of the neutralized agent in the solid pulverized state.

12 Claims, 2 Drawing Sheets

METHOD OF PURGING OF WASTE GASES

BACKGROUND OF THE INVENTION

The present invention relates to a method of purging of waste gases. More particularly, the invention relates to a process for the removal by absorption of noxious components from waste gases, particularly gases generated by the combustion of industrial and domestic wastes.

Methods of separation of noxious gases, such as $SO_2$ and HCL, from waste gases with wet residues have been known in the art for a long time. These conventional methods have two disadvantages. The first disadvantage resides in that reaction products in the form of aqueous solutions on suspensions load waste water. The second disadvantage is that waste gases are cooled off below their dew point, so that an energy-consuming repeated heating of the gases is required.

It has been suggested to avoid the above disadvantages by a so-called "wet-dry" process, which is described in the German patent publication DE-AS 21 50 186. A reagent solution is spray-injected into the gas stream contained in the reaction container or tower according to the disclosed method. The supply of the reagent solution in the form of the fine mist is determined in dependence upon the concentration of pollutants and the temperature in the purified waste gases, so that the temperature of the gas flow leaving the power is maintained above the dew point; practically all the liquid in the tower is evaporated and the reaction products are collected at the outlet of the tower in the solid state. A required quantity of a neutralizing agent is naturally proportional to the concentration of noxious components in the waste gases being processed; this quantity corresponds, under favorable conditions, to, for example, stoichiometric ratio of 1.5.

The quantity of water to be used must be at least sufficient to maintain the neutralizing agent in the state of aqueous solution or suspension. The known process is limited to such instances, in which the precalculated temperature drop of the gas caused by the evaporated water is smaller than the difference between the initial temperature of the gases and their dew point. With vapor generation particularly, the temperature, at which waste gases enter the purification system is relatively low, taking into consideration thermal efficiency; such a temperature may be, for example, 130 degrees –140 degrees C. The temperature at the end of the gas purification stage must be at least between 100 degrees and 110 degrees C. in order to ensure a necessary safety range with respect to the dow point. The temperature drop in the gas purification is only about 30 degrees. This condition is possible with a coal and oil combustion for producing steam and with the use of a slacked lime as a neutralizing agent, and only when the sulfur content in the fuel is not substantially greater than 1%. Therefore, the so-called "wet-dry" process is not usable in the instances where a fuel with a high sulfur content, such as 2 to 3%, is utilized in burners.

German patent publication No. DE-OS 25 20 045 discloses a method, in which finely pulverized dry absorption masses, such as lime dust, are spray-injected into crude gases. The temperature reduction in this method is practically avoided. The disadvantage of this, otherwise satisfactory method is that the amount of noxious gases cannot be reduced sufficiently unless the neutralizing agent is supplied into the reaction container in such a quantity that the stoichiometric ratio is multiply exceeded. This is very costly and in many cases non-attainable.

The German published application No. 25 18 079 discloses a two-stage process, in which the first stage is "wet-dry" and the second stage following the first stage is dry. A larger portion of the noxious gases, for example, about 90% is removed from the waste gases in the first "wet-dry" stage. Only relatively small remaining quantity of noxious gases is withdrawn from the gases being processed in the dry stage. It should be noted that the above described method is not economical in use of the dry stage with gases having a high concentration of noxious substances because only 7 to 15% of the dry agent are efficient for an absorption of the noxious components. Since nearly all the noxious components are separated from the waste gases in the "wet-dry stage", the quantity of water required for the two-stage process is insignificantly smaller than that in the one-stage "wet-dry" method. There, again high concentrations of noxious gases require high consumption of water, which causes a strong temperature drop as has been mentioned above. The example described in this German published application No. DE-OS 25 18 079 confirms that the temperature drop in the first stage amounts to several hundred degrees on the Celsius Scale. The conventional method, therefore, has the same limits in its use as the above discussed "wet-dry" methods.

A further known method for the absorption removal of pollutants from waste gases is known from the applicant's U.S. Pat. No. 4,208,383.

SUMMARY OF THE INVENTION

It is an object of the present invention to provide an improved method of absorption removal of noxious gases from waste gases.

It is a further object of the invention to provide a gas purification method, in which the temperature drop with high concentrations of noxious substances in existing steam generators does not exceed the temperature margin available in such installations, and in which the consumption of a neutralizing agent is significantly smaller than that in the known dry methods.

These and other objects of the invention are attained by a method of pursing hot; waste gases from pollutants including $SO_2$ or HCL and flue dust, comprising the steps of introducing the waste gases into an absorber and passing the waste gases in a gas stream through the absorber; introducing a pulverized neutralizing agent into said stream in one step; introducing into said stream a moistening substance in another step, so that the water from said moistening substance will completely evaporate while cooling the waste gases and the neutralizing agent will react with said pollutants to form dry salts therewith; and separating the gases from the dry salts in a filter, the moistening substance being introduced into said gas stream downstream of said pulverized neutralizing agent.

In the method according to the invention, in the first step of the drying process, e.g. without worth-mentioning cooling of the gases, the content of noxious gases in the waste gases is considerably reduced, for example, up to 30 to 50% with respect to the initial concentration. Only partially reacted dry neutralizing agent arrives in the second stage; the remaining noxious gas together with the stream of the waste gases is treated in the absorber in the second step, whereby the agent is moistened. The agent is thereby activated, so that a new reaction of the remaining noxious gas takes place in the reaction container or absorber. This reaction is stimulated by turbulence which is generated by a spray-injection and evaporation of the moistening substance. The moisture content of the gases required for the activation of the pulverized particles does not depend upon the quantity of the dry agent supplied in said one step of the process and therefore does not depend on the initial concentration of noxious gases. Therefore, the amounts of water to be utilized even with high concentrations of noxious components are limited so that the temperature is maintained above the dew point.

According to are of the features of the invention, the moistening substance may be clean water, for example, town water on consumption water, without addition of neutralizing agents, which is particularly advantageous when a concentration of noxious gases or pollutants in waste gases is not extremely high and more or less constant. The advantage of the method is that clogging and wear of the nozzles are avoided that a danger of cake formation on the walls of the absorber is practically excluded, and energy costs can be reduced owing to the utilization of simple one-component nozzles.

The moistening substance may be a neutralizing agent in the form of aqueous solution or aqueous suspension. This is specifically advantageous with extremely high concentration of pollutants in the waste gages.

According to a further feature of the invention, the quantity of the neutralizing agent in said one step is calculated in dependence upon the quantity of an exhaust gas and an initial concentration of pollutants in the waste gases and the quantity of the neutralizing agent in another step is calculated depending on the concentration of the pollutants in a purged gas.

The above control is advantageous with the waste gases having a varying concentration of pollutants.

Still another feature of the present invention resides in that the method includes steps of obtaining reaction products after said separating step, pulverizing said reaction products, mixing said pulverized reaction products with a fresh neutralizing agent and supplying the mixture into said gas stream in said one step. This can substantially reduce the consumption of the neutralizing agent.

The flue dust may be separated from the gas stream in the first step. This prevents the flue dust from being resupplied into the absorber together with reaction products.

The novel features which are considered as characteristic for the invention are set forth in particular in the appended claims. The invertion itself, however, both as to its construction and its method of operation, together with additional objects and advantages; thereof, will be best understood from the following description of specific embodiments when read in connection with the accompanying drawing.

DETAILED DESCRIPTION OF THE PREFERRED EMBODIMENTS

Figure 1:
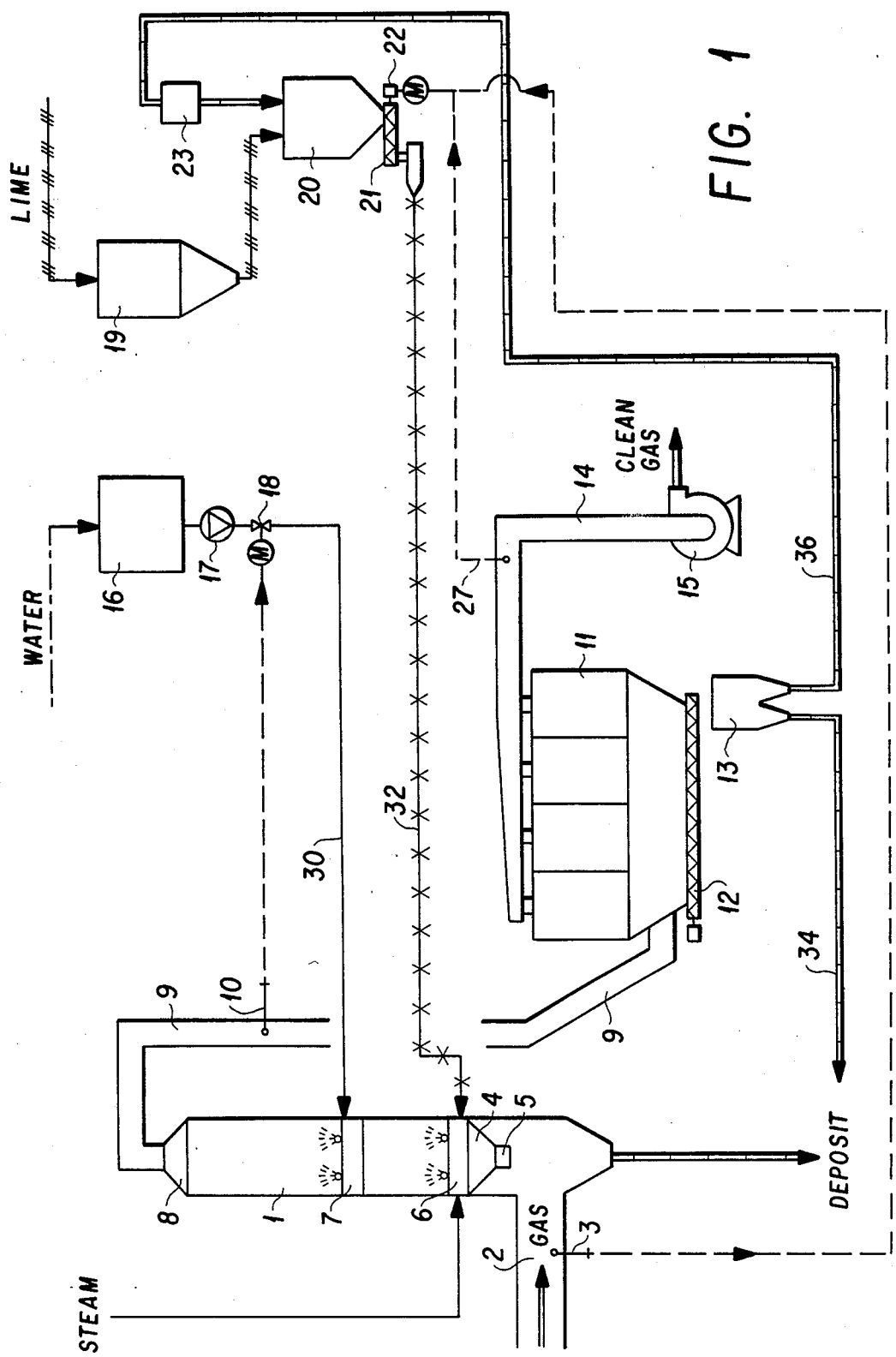
FIG. 1 is a diagrammatic view, illustrating a purging system for carrying out the method of absorptive removal of pollutants from waste gases, according to a first embodiment.

Referring now to the drawings, and first to FIG. 1, it will be seen that the reference numeral 1 resignates a reaction container on absorber 1, which is formed as a vertically extended rather slim cylinder, a waste gas conduit 2, which extends normally to the absorber 1 from a non-illustrated steam boiler, for introducing waste gases into absorber 1, tangentially opens, in a cyclone-wise manner, into a lower part of absorber 1. A gas analysis device 3 for controlling a quantity of exhaust gases and a concentration of noxious gases in the waste gases introduced into absorber 1 is installed at the inlet of the absorber 1, e.g. at the discharge of conduit 2. At a small distance from the discharge of the conduit 2 and upwardly therefrom is arranged in absorber 1 a funnel-shaped insert 4 provides with an axially extended spray nozzle tube 5. A spraying nozzle system 5 is mounted in the reaction container on absorber 1 above insert 4. A second spraying nozzle system 7 is disposed approximately midway between the nozzle system 6 and an upper outlet 8 of the absorber 1.

Spraying nozzles of both nozzle systems 6 and 7 are distributed in a conventional manner in respective horizontal cross-sections of absorber 1. The outlet 8 is connected to a discharge conduit 9, which is provided with a temperature control device 10. Discharge conduit 9 opens at the end thereof into a dust separator 11. The latter may be formed for example, as a filter and provided with a throughput screw 12. A silo 13 is arranged at the outlet of the throughput screw 12 to receive dust separated from a purified gas. A conduit 14 for purified gases leads from the dust separator 11 to a blower or ventilator 15.

The system further includes a water container 16 provided with a pump 17 and a valve 18, from which water is supplied through a conduit 30 into absorber 1. A silo for lime 19 is connected via a suitable conduit to a mixer or stirrer 20; the latter is provided with a suitable dosing and distribution device 21, which has a controllable drive 22. Pulverizer or crusher 23 for pulverizing recycled products is interconnected between silo 13 and stirrer 20.

Waste gases having the temperature, for example of 140 degrees C., which are introduced into the lower part of absorber 1, become freed from the flue dust conveyed therewith by centrifugal forces generated in the absorber. The flue dust separated from the gases is continously on from time to time, removed from the funnel-shaped bottom of the absorber; this flue dust can be brought, for example, onto a deposit. The waste gases, separated from the dust, flow further through a nozzle tube 5 into the region of spraying system 6. As shown in FIG. 1 stream is supplied into absorber 1. A pulverized slaked lime is injected through a conduit 32 into absorber 1. The slaked lime, which is here a dry pulverized neutralizing agent, pre-mixed with recycled reaction products supplied from pulverized 23 into 20, is, with the aid of steam and via the nozzle system 6, injected into the flow of waste gases, flowing in the upward direction, whereby a diffused mist is formed in the intermediate portion of absorber 1. Above this mist, water supplied into absorber 1 from conduit 30 is injected into the gas stream by means of the nozzle system 7. The quantity of water is regulated by a control system, which is symbolically shown by a dashed line extending from the temperature control device 10 to the valve 10. This water quantity is so regulated that the temperature of the waste gases in discharge conduit 9 is maintained constant above a dew point, for example 105 degrees C. Noxious gases or pollutants contained in the waste gases, for example as $SO_2$, react in the intermediate portion of the absorber first with dry particles of the neutralizing agent. Thereby, a thin neutralized layer is formed on the outer surfaces of the particles, which layer brings the reaction to standstill. The line particles flow through the stream of the waste gases towards the upper portion of the absorber and there they come into contact with injected water. As a result of a diffusion process in the flowing particles, the reaction again takes place. The reaction between the particles of the neutralizing agent, which is the staked lime in the exemplified embodiment, and the noxious gases contained in the waste gases, which takes place in the upper portion of absorber 1, continues in the discharge conduit 9 and within the dust separator 11. The concentration of noxious gases in the purified gases, which pass through the dust separator 11, and conduit 14 and discharged by the blower 15 into the atmosphere, is below the limits required by law.

Reaction products, which are discharged from the dust separator 11, are collected in the side 13 and from hence they are led through a conduit 34 to the deposit. A portion of the reaction products is supplied via a conduit 36 to the crusher or pulverizer 23 and then to the stirrer 20 in which they are intermixed with a fresh lime.

Figure 2:
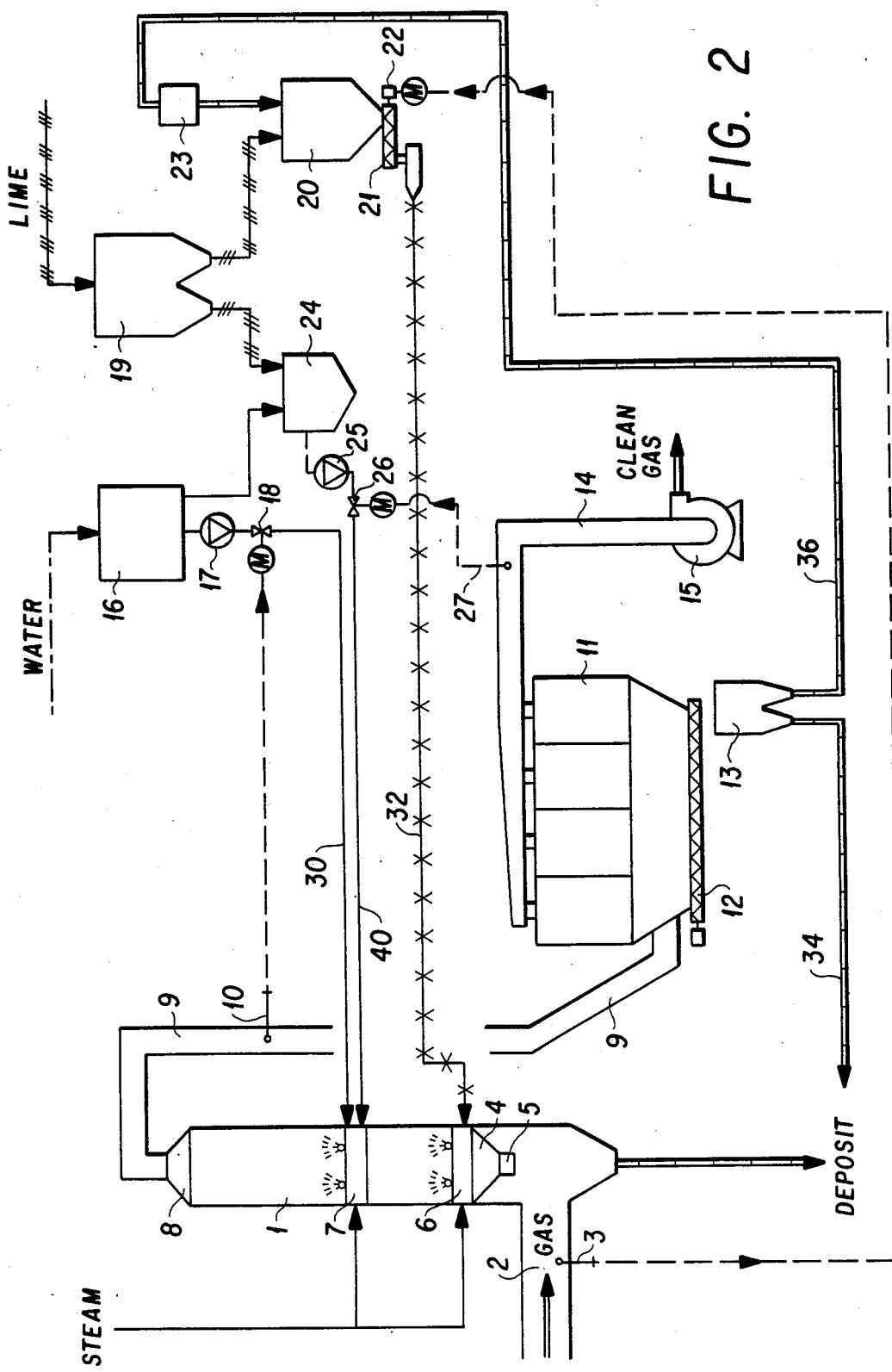
FIG. 2 is a diagrammatic view, illustrating a purging system for carrying out the inventive process, according to a second embodiment of the invention.

The embodiment shown in FIG. 2 provides for an additional possibility of adding the neutralizing agent to the gas stream, also in the second step of the process. In this embodiment, the neutralizing agent is introduced into the absorber 1 in the form of an aqueous solution or suspension.

It should be pointed out that all the similar components of the system in FIGS. 1 and 2 are designated by identical reference numerals.

For producing a solution or suspension form of the neutralizing agent, a mixer or stirrer 24 is provided, as shown in FIG. 2. A pump 25 and a valve 26 are interconnected between the stirrer 24 and nozzle system 7 via a conduit 40. Valve 36 is connected by means of a controlled conduit system to a measuring device 27 for measuring concentration of noxious gases or pollutants in the purged gases. Measuring device 27 is installed in conduit 14 leading to the blower 15.

The stirrer 24 is continuously supplied with lime from the silo 19 and with water from container 16, the quantities of water and lime received in the stirrer 24 are predetermined, so that water-lime ratio in stirrer 24 remains constant. A uniform lime concentration is contained by an agitation process in stirrer 24, whereby a milk of lime is produced. The milk of lime, the quantity of which depends upon a residue concentration of noxious gases in the gases after the latter had been processed through the dust separator 11, is supplied to the nozzle system 7. Furthermore, the adjusted quantity of water at a temperature, which is above the temperature of the waste gases leaving the absorber, is supplied to the spraying nozzle system 7. The nozzle system 7 is provided with injector nozzles, which are loaded with steam.

In the above-described modification of the process according to the invention, it is suggested that, when in addition to one main noxious gas component in a slight concentration of the waste gases yet another noxious gas appears; this another noxious gas occurring for example in refuse combustion devices, is not controllable by usual measuring techniques. The measuring device 3 for concentration of pollutants controls only the main gas component. Accordingly, the dry neutralizing agent is added only in a quantity corresponding to the concentration of the main noxious gas Since other non-controllable gas components eventually consume the neutralizing agent, the concentration of the main noxious component in the dry stage of the process is not required to a predetermined rate. Hence, the waste gas flowing through the measuring device 27 still has a relatively high concentration of noxious gas. The problem is solved by addition of the neutralizing agent in the state of aqueous solution or suspension to the waste gases in absorber 1 through the nozzle system 7.

During the purifying process in absober 1, the waste gases flowing upwards react with milk of lime or sodium hydroxide to form salts, which are passed with the gas through discharge conduit 9 into dust separator or filter 11, where the separation is effected. Chemical reaction in absorber 1 may continue in conduit 9 and dust separator 11.

It is to be understood that neutralizing agents, other than lime, may also be used in the process of the invention.

The measuring device for the concentration of the various pollutants or noxious gases in the waste gases may be in the form of a conventional device adapted to measure the continuous changes in the concentration of noxious gases, particularly in case of waste combustion installations since the composition of the waste products is subject to great variation. The concentrations of the noxious gases are concurrently measured, which directly calculates the necessary amount of neutralizing agent which must be introduced into the absorber 1.

The devices for carrying out these measurements may be conventional gas analysis apparatus, particularly of the type that operates by means of absorption spectrum analysis. In these devices, as is known, the differential absorption properties of the various noxious gas components are determined relative to ultra-violet or infrared ray absorption.

If the embodiment of FIG. 1 shows the supply of water into absorber 1 in the region of nozzle system 7, the embodiment of FIG. 2 illustrates the supplying of lime in the form of aqueous solution or aqueous suspension into the absorber into nozzle system 7. Thus, the moistening substance introduced into the absorber may be either water or the aqueous solution of lime. It is essential, however, that the moistening agent, which supplies water into the absorber, must be injected into the stream of the waste gases flowing from the inlet of the absorber to its outlet in the region of the nozzle system 7, in other words, downstream of the nozzle system 6, into which a solid pulverized lime is introduced.

It will be understood that each of the elements described above, or two or more together, may also find a useful application in other types of methods of purifying of waste gases differing from the types described above.

While the invention has been illustrated and described as embodied in a method of purging of waste gases from pollutants, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

What is claimed as new and desired to be protected by Letters Patent is set forth in the appended claims.

I claim:

1. A method of purging hot waste gases from pollutants consisted of $SO_2$ or HCL, and flue dust, comprising the steps of introducing the waste gases into an absorber and passing the waste gases in a gas stream through the absorber; introducing a pulverulent neutralizing agent into said stream in said absorber in one step; introducing into said stream in said absorber a moistening substance in another step so that the water from said moistering substance will completely evaporate while cooling the waste gases whereas the neutralizing agent will react with said pollutants of the waste gases to form dry salts with said pollutants; removing the gases and dry salts from the absorber; and separating the gases from the dry salts in a filter, the moistening substance being introduced into said gas stream downstream of said neutralizing agent.

2. The method as defined in claim 1, wherein said moistening substance is water.

3. The method as defined in claim 1, wherein said pulverized neutralizing agent is lime.

4. The method as defined in claim 1, wherein said moistening substance is a neutralizing agent in the form of aqueous solution or aqueous suspension.

5. The method as defined in claim 4, wherein said neutralizing substance is lime and said moistening agent is lime in the form of aqueous solution or aqueous suspension.

6. The method as defined in claim 4, wherein the quantity of the neutralizing agent in said one step is calculated in dependence upon the quantity of the exhaust gas and an initial concentration of pollutants in the waste gases and the quantity of the neutralizing agent in another step is calculated depending on a concentration of the pollutants in a purged gas.

7. The method as defined on claim 6, further including steps of obtaining reaction products from said separating step, pulverizing said reaction products, mixing said pulverized reaction products with a fresh neutralizing agent and supplying the mixture into said gas stream in said one step.

8. The method as defined in claim 7, wherein flue dust is separated from the gas stream in said one step.

9. A method of purging hot waste gases from pollutants consisted of $SO_2$ or HCL, and flue dust, comprising the steps of introducing the waste gases into an absorber and passing the waste gases in a gas stream through the absorber and injecting a neutralizing agent into the stream of the waste gases in the absorber; injecting water together with the neutralizing agent into said absorber, so that water will completely evaporate while cooling waste gases whereas the neutralizing agent will react with the pollutants of the waste gases to form dry salts with said pollutants; and passing the gases and dry salts from the absorber through a filter to separate the dry salts from the gases, said step of injecting the neutralizing agent including a first step in which the neutralizing agent is injected into the absorber in a dry pulverent state and a second step in which the neutralizing agent is injected into the absorber in a wet state, the neutralizing agent in said second step being injected into the stream of the waste gases downstream of the neutralizing agent in said first step.

10. The method as defined in claim 9, wherein the neutralizing agent in said first step is a pulverent lime and the neutralizing agent in said second step is lime in the form of aqueous solution or aqueous suspension.

11. A method of purging hot waste gases from pollutants consisted of $SO_2$ or HCL and flue dust, comprising the steps of introducing the waste gases into an absorber and passing the waste gases in a gas stream through the absorber; introducing a pulverulent lime into said stream in said absorber in one step; introducing into said stream in said absorber water in another step so that water will completely evaporate while cooling the waste gases whereas lime will react with said pollutants of the waste gases to form dry salts with said pollutants; removing the gases and dry salts from the absorber; and separating the gases from the dry salts in a filter, the water being introduced into said gas stream downstream of lime.

12. A method of purging hot waste gases from pollutants consisted of $SO_2$ or HCL and flue dust, comprising the steps of introducing waste gases into an absorber and passing the waste gases in a gas stream through the absorber and injecting lime into the stream of the waste gases in the absorber; injecting water together with lime into said absorber, so that water will completely evaporate while cooling waste gases whereas lime will react with said pollutants of the waste gases to form dry salts with said pollutants; and passing the gases and dry salts from the absorber through a filter to separate the dry salts from the gases, said step of injecting lime including a first step in which the lime is injected into the absorber in a dry pulverulent state and a second step in which the lime is injected into the absorber in the form of aqueous solution, the lime in said second step being injected into the stream of the waste gases downstream of the pulverulent lime in said first step.

* * * * *